Dec. 16, 1952      D. C. HARVEY      2,621,866
FILM METERING MECHANISM
Filed March 3, 1950
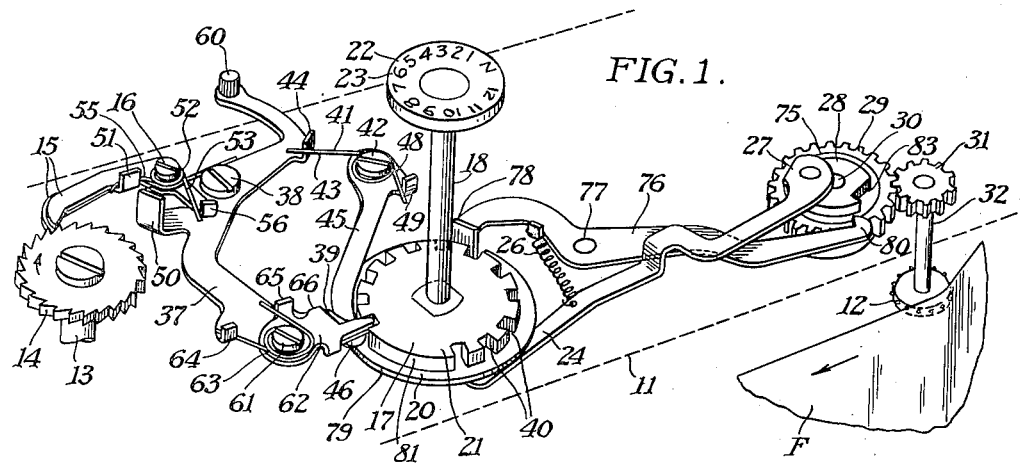
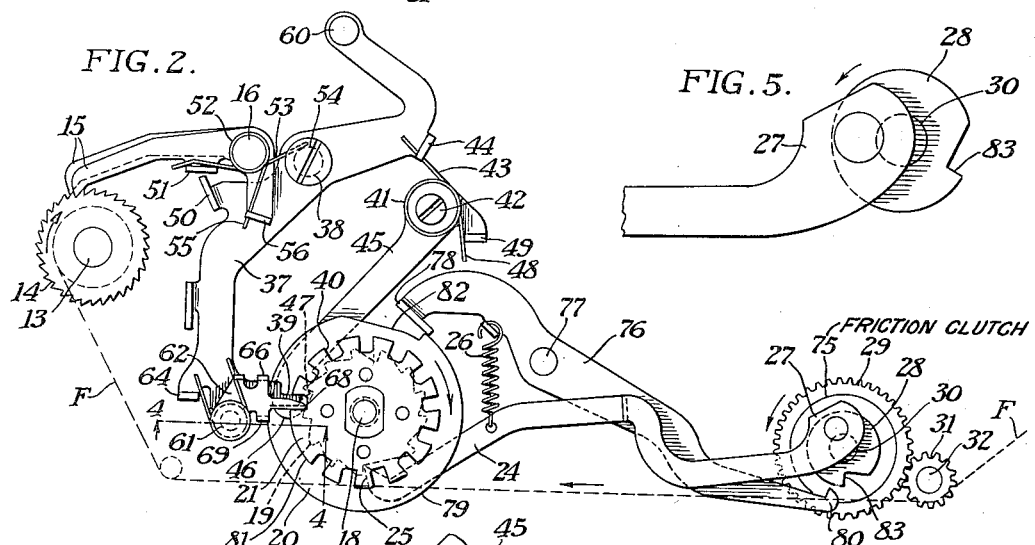
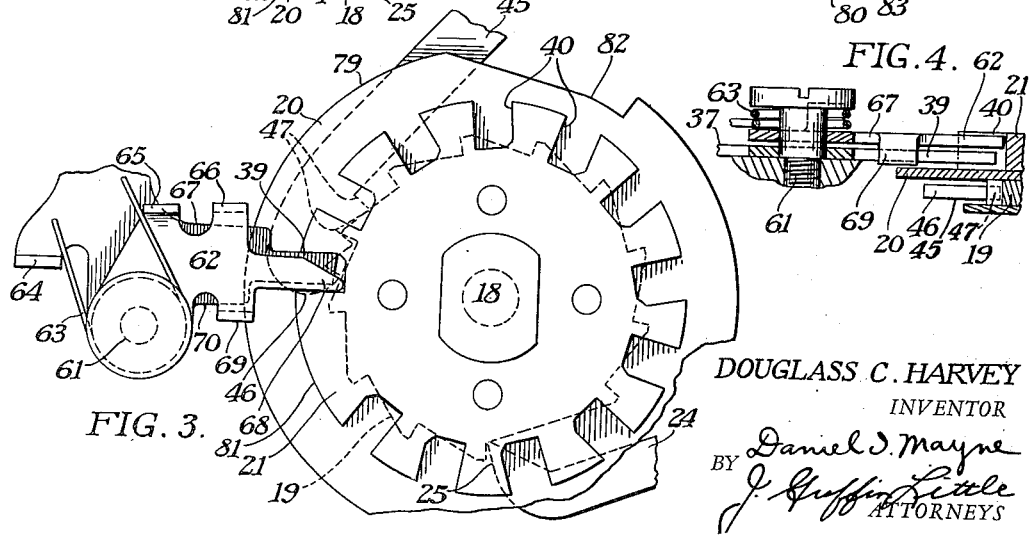
DOUGLASS C. HARVEY
INVENTOR
BY Daniel J. Mayne
J. Griffin Little
ATTORNEYS Patented Dec. 16, 1952

2,621,866

UNITED STATES PATENT OFFICE 2,621,866

FILM METERING MECHANISM

Douglass C. Harvey, Rochester, N. Y., assignor to Eastman Kodak Company, Rochester, N. Y., a corporation of New Jersey Application March 3, 1950, Serial No. 147,530

11 Claims. (Cl. 242—71)

The present invention relates to roll film cameras and more particularly to a film-metering mechanism therefor.

As is well known, in cameras of this type it is desirable to provide a mechanism which will lock the film-winding or -moving means automatically after each exposed image area has been wound onto the take-up spool or spindle, and the unexposed frame or area has been moved into exposing position. With such a mechanism, it is desirable to provide an arrangement by which the locking mechanism may be disengaged or rendered inoperative after the last exposure is made and wound up to permit the free winding of the trailer strip and the subsequent winding of the leader strip of a new roll of film.

In roll films, the picture areas are accurately and precisely spaced along the film strip so that exactly equal lineal movements of the film strips will bring successive areas into exposing position. However, the lengths of the leader and trailer strips or portions thereof usually are not held to such accurate tolerances. Therefore, if the mechanism utilized to lock the film-winding mechanism remains connected to the film metering device during winding of the trailer and leader strips, it may be found that the locking mechanism is out of phase or improperly adjusted relative to the picture areas of the new film strip. For this reason, it has been found desirable to provide means to disconnect the locking mechanism completely from the measuring roll after the last exposure is made and to retain said mechanism in its adjusted or phased relation during the winding of the trailer and leader strips. Then, when the first picture area of the new roll is moved into position, the locking and indexing means will be in proper relation to the film strip, the advantages of which are deemed apparent.

Accordingly, it is desirable to provide indexing means for maintaining the control elements of the locking mechanism in proper phased relation so as to lock the winding mechanism releasably after each exposure is made. Also, it is essential to lock the indexing mechanism after the last exposure has been wound up, and simultaneously disconnect the indexing means in its proper phased relation. This locking and disconnecting of the indexing means is automatic and assures that the parts will be in their proper relation at the start of the next winding cycle.

To insure this result, the present invention connects the indexing means to a film-measuring roll through a clutch, preferably of the friction type, so that the indexing means will be moved in proper timed relation to the lineal movement of the film strip to lock automatically the winding mechanism as each image area is moved into exposing position. When, however, the last exposure has been made and the image area wound up, means controlled by the indexing means serves to lock the latter and its associated parts against further movement, and simultaneously disconnects the measuring roll and the winding mechanism therefrom. Thus, the locking mechanism is not rendered inoperative until the final exposure has been made and wound up. The freed winding mechanism may then be rotated to wind up the trailer and the subsequent leader strips. After the first picture area of a new strip has been moved into position, the indexing means is manually adjusted to render the disconnecting means inoperative and to connect the indexing means in proper phased relation to the measuring roll so that subsequent operations of the indexing means to lock the winding mechanism will be in proper relation to the movements and positions of the successive picture areas.

The present invention thus has as one of its objects a film-metering mechanism which effectively and automatically locks the film-winding mechanism as each exposed frame is wound up.

Yet another object of the invention is the provision of a film-metering mechanism which is rendered inoperative when, and only when, the last area has been wound onto the take-up spindle. The rendering of the metering mechanism inoperative at this time permits easy and unrestricted winding of the trailer and leader strips without changing the position of the indexing mechanism.

Still another object of the invention is the provision of an arrangement for maintaining the phased relation of the indexing means after the last exposure is made so as to retain the indexing means in proper position to control the movement of a new film when placed in the camera. The phasing of the indexing means is controlled from and by the indexing means itself.

Another object of the invention is the provision of a phasing and releasing mechanism for the index means which is simple, rugged, accurate, positive in its action and highly effective in use.

To these and other ends the invention resides in certain improvements and combinations of parts, all as will be hereinafter more fully described, the novel features being pointed out in the claims at the end of the specification.

In the drawings:

Fig. 1 is a perspective view showing the film-measuring and -metering mechanism constructed in accordance with the preferred embodiments of the present invention.

Fig. 2 is a plan view of the mechanism illustrated in Fig. 1, showing the relation of the parts just after the last exposure has been made but before winding up;

Fig. 3 is a partial view of the indexing mechanism and its associated parts on a larger scale than Fig. 2, showing the relation of the double pawl when in engaging relation with the metering disk;

Fig. 4 is an enlarged vertical sectional view taken substantially on line 4—4 of Fig. 2, showing the relation of the control lever hold-out and the indexing means; and Fig. 5 is a plan view of the driving eccentric and the end of the drive pawl showing the relation of the parts.

Similar reference numerals throughout the various views indicate the same parts.

Fig. 1 of the drawings shows a wall 11 of a roll film camera on which the film-metering mechanism of the present invention is mounted. The film is unwound from a supply spool, not shown, passes over a measuring roll 12 and the exposure frame, and is finally wound up on a take-up spool mounted on the take-up spindle 13. The latter carries a ratchet 14 adapted to be engaged by a pair of pawls 15 pivoted at 16 on the wall 11. The pawls 15 are adapted to engage the ratchet 14 to lock the winding mechanism against further rotation in a manner and for a purpose to be later described. The two pawls 15 are spaced one-half the circular pitch of the teeth of the ratchet 14 to double the accuracy of the winding stop position, the advantage of which is deemed apparent. As both pawls 15 serve merely to engage the ratchet 14 to lock the latter, the pawls may be considered broadly as a single pawl and may be so construed when used in the claims.

In order that the pawls 15 may be moved into locking relation with the ratchet 14 and in proper timed relation with the film movement, the pawls are controlled by what may be termed an indexing mechanism or means broadly indicated by the numeral 17 and operatively connected, in a manner to be later described, to the film-measuring roll 12. The indexing means comprises a shaft 18 on which are arranged in overlying or stacked relation, a ratchet 19, a phasing disk 20 and an index wheel 21, as shown in Figs. 1, 2 and 3. The shaft 18 extends to a position outside the camera body, and carries an exposure indicator dial 22 on which are positioned a plurality of numerals 23 to indicate the various exposures. A driving pawl 24 has one end 25 held in engagement with ratchet 19 by means of a spring 26, to be later discussed. The other end 27 of the pawl 24 is eccentrically mounted on a driving eccentric 28 frictionally connected to a gear 29 in a manner to be later described. The eccentric 28 and the gear 29 are mounted for free rotation on a shaft 30, the gear 29 meshes with a gear 31 carried by the measuring roll shaft 32 so that as the roll 12 is rotated the gear 29 and the eccentric 28 will be rotated. The gears 29 and 30 are so designed that gear 29 and eccentric 28 will make one complete revolution when the film strip has been moved the distance of one image area. Due to the eccentric connection of the driving pawl 24 on the eccentric 28, a single revolution of the latter will impart a single reciprocation to pawl 24 to cause the end 25 thereof to engage ratchet 19 to move the latter a definite amount, one tooth, to actuate the indexing means.

The index wheel 21, disk 20 and ratchet 19 are all secured to shaft 18 so as to rotate as a unit when rotary movement is imparted to ratchet 19 by the reciprocation of pawl 24. This turning of the index means is in timed relation to the lineal movement of the film strip by reason of its connection to roll 12, and is utilized to control the locking movement of pawls 15. To this end, a bell crank of lever 37 is pivoted at 38 on wall 11 and has one end thereof formed to provide a radially extending finger or pawl 39 adapted to extend into one of a plurality of peripheral notches 40 formed on the index wheel 21, the number of such notches depending upon the number of exposures on the film strip. In the present instance, the wheel 21 is shown with twelve notches for use with a twelve-exposure film strip. A coil spring 41 is wrapped about a stud 42, carried by wall 11, has one end 43 engaging a lug 44 on lever 37 and tends to turn the latter counterclockwise about its pivot 38 to hold the pawl 39 in a position against the periphery of wheel 21. The stud 42 also has mounted thereon a hold-back pawl 45, the end 46 of which is formed with teeth 47 engaging ratchet 19 to prevent a reverse rotation thereof, as is deemed apparent from an inspection of Figs. 2 and 3. The other end 48 of coil spring 41 engages a lug 49 on pawl 45 and tends to turn the latter in a counterclockwise direction to retain teeth 47 in engagement with ratchet 19.

It is now apparent that when the film rotates roll 12, a reciprocation will be imparted to pawl 24 to rotate the indexing means, as above described. When the film strip has been moved the full distance of one image area, the indexing means will have been moved a distance of one tooth of ratchet 19 so as to bring one of the notches 40 of wheel 21 into registry with the pawl 39. Thereupon the latter will move radially inwardly, or to the right as viewed in Figs. 1, 2 and 3, to move the pawl 39 into the registering notch 40, under the action of spring 41. Such movement will rotate or rock lever 37 in a counterclockwise direction about pivot 38 to move a lug 50 on lever 37 out of holding relation with a cooperating lug 51 on pawls 15 to free the latter. A coil spring 52, wrapped around pivot 16, has one arm 53 engaging a boss 56 on lever 37 and the other arm 55 engaging the lug 51 on the double pawls 15 to rock the latter in a counterclockwise direction about pivot 16 and into locking or holding relation with the ratchet 14 to prevent further winding movement of the spindle 13. Thus, the spindle 13 is rotated to wind up the exposed area, and at the completion of the winding operation the spindle is automatically and completely locked against further rotation.

Simultaneously with the winding up of the exposed image area, an unexposed portion of the film is moved into exposing position, as is deemed apparent. After each exposure has been made, the control lever 37 is rotated or rocked in a clockwise direction by means of the finger knob 60. Such movement serves to withdraw the pawl 39 from its registering notch 40. However, it is apparent that if the lever 37 is now released the pawl 39, which is still in registry with notch 30, would re-enter the notch 40 to lock the winding mechanism again. In order to prevent such a reentry, the control lever 37 has pivotally mounted thereon at 61 a hold-out pawl 62 which overlies pawl 39 and enters notch 40 with pawl 39. A coil spring 63 is wrapped around pivot 61 and has one end in engagement with a lug 64 on lever 37 and the other end in engagement with a lug 65 on pawl 62 and tends to rotate the latter in a clockwise direction about its pivot. Now, when lever 37 is rocked in a clockwise direction, as mentioned above, drawing pawl 39 from notch 40, the pawl 62 is also withdrawn. However, when pawl 62 clears wheel 21, it rocks in a clockwise direction relative to lever 37 and out of registry with pawl 39. The result is that when lever 37 is released, it moves pawls 39 and 62 to the right until the end of pawl 62 engages the periphery of the wheel 21 between the notches 40. As pawl 62 is longer than pawl 39, the latter will be held free of the notch 40 in the index wheel 21. A down-turned lug 66 on pawl 62 engages an edge 67 of pawl 39 to limit the movement of pawl 62 relative to pawl 39. The winding mechanism is now free, and spindle 13 may be rotated to wind up the exposed image area.

As the film is being wound the eccentric 28 is rotated, and the pawl 23 is reciprocated to turn the indexing means to move wheel 21. Near the end of the winding operation the next notch 40 moves into registry with the hold-out pawl 62. As the latter is slightly longer than pawl 39, the tapered end 68 of pawl 62 enters notch 40 slightly ahead of pawl 39. Continued rotation of wheel 21 finally causes an edge of notch 40 to rock pawl 62 slightly in a counterclockwise direction, such movement being limited by the engagement of a lug 69 on pawl 62 with an edge 70 of pawl 39. Such engagement serves to move pawl 62 into registry with pawl 39 so that the latter will also move into the registering notch 40 to allow lever 37 to rotate counterclockwise to release pawls 15 which then move into holding relation with ratchet 14, under the action of spring 52, to arrest further film movement. Thus, as each exposed film area is wound, the winding mechanism is locked completely, automatically and positively. In order to release the winding means, lever 37 is rocked clockwise to withdraw pawls 39 and 62 from notch 40. The pawl 62 then rocks on lever 37 and relative to pawl 39 to a position out of registry with the latter, so that upon releasing lever 37 the end of pawl 62 engages the periphery of wheel 21 between notches 40 to hold the pawls 39 and 62 out of engaging relation with notch 40. Such positioning of lever 37 also serves to engage lugs 50 and 51 to retain pawls 15 out of locking or holding relation with ratchet 14 to free spindle 13 to permit winding of the film. The alternative winding, locking and releasing continues until all the exposures are made. It is then necessary to wind up the last exposure and the trailer portion of the strip to protect the exposed image areas, as is well known. A new roll is then placed in the camera, and the leader strip unwound and the film moved until an indicating mark, such as numeral 1, is observed in the film window in the back of the camera.

As mentioned above, the lengths of the trailer and leader strips are not held to close tolerances so that the lengths may vary from roll to roll. Therefore, it is apparent that if the indexing means were connected positively to the measuring roll 12 during the final and initial windings, then when the numeral 1 of the new film appears in the camera window the indexing means might not be in its proper or phasing relation with the positioned film strip, the disadvantages of which are apparent. In order to overcome this disadvantage, the present invention provides an arrangement by which the indexing means is completely and automatically disconnected from the measuring roll after the last exposure is wound up on the take-up spool. Also, the indexing means is locked automatically in a definite position so that when new film is moved to bring the first exposure into operative relation, the indexing means will be in proper phased relation therewith.

To secure this result, the gear 29 is connected to the driving eccentric 28 through a friction clutch which may be in the form of a disk 75 of friction material positioned between gear 29 and eccentric 28. This disk 75 transmits the torque or turning force applied to gear 29 to the eccentric 28 to rotate the latter to reciprocate pawl 24 which, in turn, rotates the indexing means as explained above. However, if eccentric 28 is held against rotation, the indexing means is disconnected from roll 12, but the disk 75 will still permit the necessary freedom of rotation of the measuring roll 12 necessary to wind the trailer and leader strips. Thus, the indexing means may be connected to the measuring roll 12 so as to be actuated thereby during the normal operation, yet, after the last exposure has been wound up, the indexing means may be completely disconnected from the measuring roll 12 merely by holding the eccentric 28 against rotation. In the preferred consideration the holding of eccentric 28 is controlled by the indexing means so that the holding operation will be in proper timed relation to the functioning of the indexing means so that the parts will be in proper phased relation to the film-winding operation.

To secure this result a phasing lever 76 is pivoted at 77 on wall 11. The left end of lever 76 is provided with a bent over portion 78 which engages and rides on the surface 79 of disk 20, as shown in Figs. 1 and 2. The above-mentioned spring 26 has one end connected to pawl 24 to hold the latter against ratchet 19, while the other end is connected to lever 76 to hold portion 78 in positive contact with surface 79, as shown. The other, or right, end of lever 76 is formed with a locking pawl 80 positioned adjacent eccentric 28, as clearly illustrated in Figs. 1 and 2. As the various winding operations are performed, the portion 78 of lever 76 rides along the periphery 79 of disk 20. However, after the last exposure is made, the lever 37 is rocked as above-described, to withdraw pawls 39 and 62 out of the last notch 40 to permit the winding up of the last exposure. Figs. 1, 2 and 3 show the position of the parts just prior to this last releasing operation. Release of lever 37 then positions pawl 62 on an unnotched or blank portion 81 of the index wheel 21 to hold pawl 39 out of the last notch 40. The spindle 13 is then rotated to wind up the last exposure. Such winding serves to rotate the measuring roll 12 which, through gears 29 and 31, friction disk 75 and pawl 24, imparts a rotary movement to the indexing means to rotate disk 20 slightly. This movement of disk 20 finally brings a notch or recess 82 on the periphery 79 into registration with the pawl or lug 78, and the latter moves into the recess 82 under the action of spring 26. During this rotative movement of the parts, eccentric 28 is, of course, also turned and positions a notch 83, formed on its periphery, in registry with pawl 80. Now, when the lever 76 is rocked by the dropping of portion 78 into recess 82, the pawl 80 engages in the notch 83 of the eccentric to hold or lock the latter against further rotation. The notch eccentric 28 may be considered broadly as a single-tooth ratchet with which the pawl 80 cooperates to hold the eccentric and its associated parts in a fixed position. Thus, when the last exposed area is wound up, the indexing means is locked in a fixed position with the spindle 13 freed to permit winding of the trailer and leader strips. The clutch disk 75 permits free rotation of the measuring roll 12 and the gears 29 and 31, while the eccentric 28 is held stationary. By means of this arrangement, the indexing means is retained in proper phased relation. Also, the mechanism for locking the indexing means in phased relation is controlled by the indexing means itself so as to insure the proper phasing.

At the start of a new roll of film, the exposure indicator dial 22, which is keyed to shaft 18, must be set to the neutral position N on the dial 22 or left set at a position slightly beyond the numeral 12 on the dial, the position the dial occupies after the winding of the last or twelfth exposure. At either of these positions, the portion 78 of lever 76 is in notch 82 and pawl 80 of the lever 76 engages the notch or tooth 83 of the eccentric 28. At this time the pawl 62 is riding on a blank portion 81 of wheel 21, all as above described. The new film strip is now advanced until the numeral 1 appears in the window at the back of the camera during which time the indexing means and its associated parts are locked in a fixed position, as previously described. After the numeral 1 on the film strip appears in the window, exposure dial 22 is manually rotated in a clockwise direction to impart a similar rotation to the indexing means. Such rotation performs two functions; first, it causes pawl 62 to ride over the blank portions 81 until the first notch, the lower left hand notch, Figs. 2 and 3, registers with pawls 39 and 62. At this time the pawls then drop into the registering notch 40 to lock the winding spindle. Second, such rotation of the indexing means serves to cam the portion 78 of lever 76 out of notch 82 and rock the phasing lever 76 in a clockwise direction to move the pawl 80 out of engaging relation with the notch 83 of the driving eccentric 28 to again connect the indexing means to the measuring roll by means of the friction clutch member 75.

Thus, the present invention provides a positive, automatic means for disconnecting the indexing means from the film-measuring roll after the last exposure has been made and wound up. This connecting means is controlled directly by the indexing means itself, so as to insure the retention of the indexing means in its proper phased relation to insure proper functioning during the subsequent winding operations. The structure of the present invention is simple, rugged, positive in its action, and highly effective in use.

While one embodiment of the invention has been disclosed, it is to be understood that the inventive idea may be carried out in a number of ways. Therefore, the present invention is to be limited only insofar as is necessitated by the prior art.

What I claim and desire to secure by Letters Patent of the United States is:

1. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, and means including a clutch for connecting said actuating means releasably to said measuring roll to operate said indexing means in timed relation to the movement of said film strip.

2. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, means including a friction clutch for connecting said actuating means releasably to said measuring roll to operate said indexing means in timed relation to the movement of said strip over said roll, and means for always maintaining said actuating means in engagement with said indexing means.

3. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, means including a clutch for connecting said actuating means releasably to said measuring roll to operate said indexing means in timed relation to the movement of said film strip, and means for phasing of said indexing means when said actuating means is released from said measuring roll.

4. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, means including a clutch for connecting said actuating means releasably to said measuring roll to operate said indexing means in timed relation to the movement of said film strip, and means controlled by said indexing means for phasing said indexing means when said actuating means is released from said measuring roll.

5. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, means including a clutch for connecting said actuating means releasably to said measuring roll to operate said indexing means in timed relation to the movement of said film strip, and means controlled by said indexing means and operative upon said connecting means for phasing said indexing means when said actuating means is released from said measuring roll.

6. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, a rotatable driving eccentric, means to connect said actuating means eccentrically to said driving eccentric so that rotation of the latter will move said actuating means and operate said indexing means, means including a friction clutch for connecting said measuring roll to said driving eccentric to rotate the latter in timed relation to the movement of said strip over said roll, a phasing lever, and means for moving said phasing lever into locking relation with said driving eccentric when a predetermined number of exposures have been made to hold said actuating means and said indexing means against further movement to phase said indexing means.

7. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, means for actuating said indexing means, a rotatable driving eccentric, means to connect said actuating means eccentrically to said driving eccentric so that rotation of the latter will move said actuating means and operate said indexing means, means including a friction clutch for connecting said measuring roll to said driving eccentric to rotate the latter in timed relation to the movement of said strip over said roll, a phasing lever, and means controlled by said indexing means for moving said phasing lever automatically into holding relation with said driving eccentric to prevent further rotation of the latter at the completion of a predetermined number of exposures to phase said indexing means.

8. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, a driving pawl, means for maintaining one end of said driving pawl in permanent engagement with said indexing means, a rotatable driving eccentric, means for connecting the other end of said driving pawl eccentrically to said eccentric so that rotation of the latter will move said driving pawl to actuate said indexing means, means including a friction clutch for connecting said eccentric releasably to said roll so that actuation of said indexing means will be in a definite timed relation to the movement of the film strip over said roll, a phasing lever rockably mounted on said body, means for maintaining one end of said phasing lever in permanent engagement with said indexing means, and means controlled by said indexing means at the completion of a definite number of exposures for rocking said phasing lever to move the other end thereof into locking relation with said eccentric to disconnect said roll from said indexing means to maintain the latter in phased relation.

9. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, a driving pawl, means for maintaining one end of said driving pawl in permanent engagement with said indexing means, a rotatable driving eccentric, means for connecting the other end of said driving pawl eccentrically to said eccentric so that rotation of the latter will move said driving pawl to actuate said indexing means, means including a friction clutch for connecting said eccentric releasably to said roll so that actuation of said indexing means will be in a definite timed relation to the movement of the film strip over said roll, a phasing lever rockably mounted on said body, means for maintaining one end of said phasing lever in permanent engagement with said indexing means, a one-tooth ratchet formed on said eccentric, a locking pawl formed on the other end of said phasing lever and positioned adjacent said one-tooth ratchet on said eccentric, and means controlled by said indexing means at the completion of a predetermined number of exposures to rock said phasing lever to move said locking pawl into holding relation with said one-tooth ratchet to lock said eccentric against further rotation both to disconnect said indexing means from said roll and to phase said indexing means.

10. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of an indexing means comprising a phasing disc connected to said pawl to permit the latter to move into locking relation with said ratchet when a predetermined length of film has been wound, a driving pawl mounted for reciprocating movement on said body and having one end connected permanently to said indexing means to actuate the latter, means controlled by said measuring roll to impart a reciprocation to said driving pawl to operate said indexing means in timed relation to the movement of said film strip, a friction clutch connecting said last-mentioned means to said measuring roll, and means controlled by said phasing disk for locking said driving pawl against further actuation after the last exposure has been made to phase said driving pawl and said indexing means.

11. In a roll film camera having a camera body, the combination with a rotatable take-up spindle mounted on said body for winding up a film strip after each exposure, a ratchet carried by said spindle, a movable pawl, a measuring roll positioned on said body to be engaged and rotated by the movement of said strip and in timed relation therewith, of an indexing means comprising a notched index wheel connected to said pawl to permit the latter to move into locking relation with said ratchet when a predetermined length of film has been wound, a notched phasing disk connected to said wheel, a driving pawl mounted for reciprocating movement on said body and having one end connected permanently to said indexing means to actuate the latter, a rotatable driving eccentric mounted on said body, means for connecting the other end of said driving pawl eccentrically to said eccentric so that rotation of the latter will reciprocate said driving pawl to actuate said indexing means, means including a friction clutch for connecting said eccentric releasably to said measuring roll to operate said indexing means in timed relation to the movement of said strip, a one-tooth ratchet formed on said eccentric, a phasing lever pivoted on said body and having one end thereof positioned adjacent said phasing disk, said disk having the notch therein movable into registry with said one end of said phasing lever after a predetermined number of exposures has been made, means for rocking said phasing lever to move the one end thereof into the notch of said disk, and a holding pawl formed on the other end of said phasing lever so that upon rocking the latter said holding pawl will move into holding relation with said one-tooth ratchet to lock said driving pawl and indexing means against further movement and to disconnect said indexing means from said roll to retain the phased relation of said indexing means.

DOUGLASS C. HARVEY.

REFERENCES CITED

The following references are of record in the file of this patent:

UNITED STATES PATENTS

| Number | Name | Date |
|---|---|---|
| 2,063,331 | Nagel | Dec. 8, 1936 |
| 2,090,017 | Young | Aug. 17, 1937 |